J. R. GEORGE

Jan. 31, 1933. ROLLING MILL HOUSING Re. 18,724

Original Filed March 28, 1928 3 Sheets-Sheet 1

Inventor:
Jerome R. George
By Geo. H. Kennedy Jr.
Attorney

J. R. GEORGE

Jan. 31, 1933. ROLLING MILL HOUSING Re. 18,724

Original Filed March 28, 1928 3 Sheets-Sheet 2

Inventor:
Jerome R. George
By Geo. M. Kennedy Jr.
Attorney

J. R. GEORGE

Jan. 31, 1933. ROLLING MILL HOUSING Re. 18,724

Original Filed March 28, 1928 3 Sheets-Sheet 3

Inventor:
Jerome R. George
By Geo. H. Kennedy Jr.
Attorney

Reissued Jan. 31, 1933

Re. 18,724

UNITED STATES PATENT OFFICE

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

ROLLING MILL HOUSING

Original No. 1,786,296, dated December 23, 1930, Serial No. 265,446, filed March 28, 1928. Application for reissue filed October 22, 1931. Serial No. 570,478.

The present invention relates to rolling mills, and has particular reference to improvements in the housing structures which support and provide the bearings for the cooperating reducing rolls of a rolling mill. The invention resides in a novel roll housing assembly which greatly facilitates the removal, when desired, of the rolls therefrom, and also the adjustment of said rolls therein. The above and other objects and advantages of the invention are set forth in detail in this specification, reference being had in this connection to the accompanying drawings, in which—

Like reference characters refer to like parts in the different figures.

Figures 1, 4:
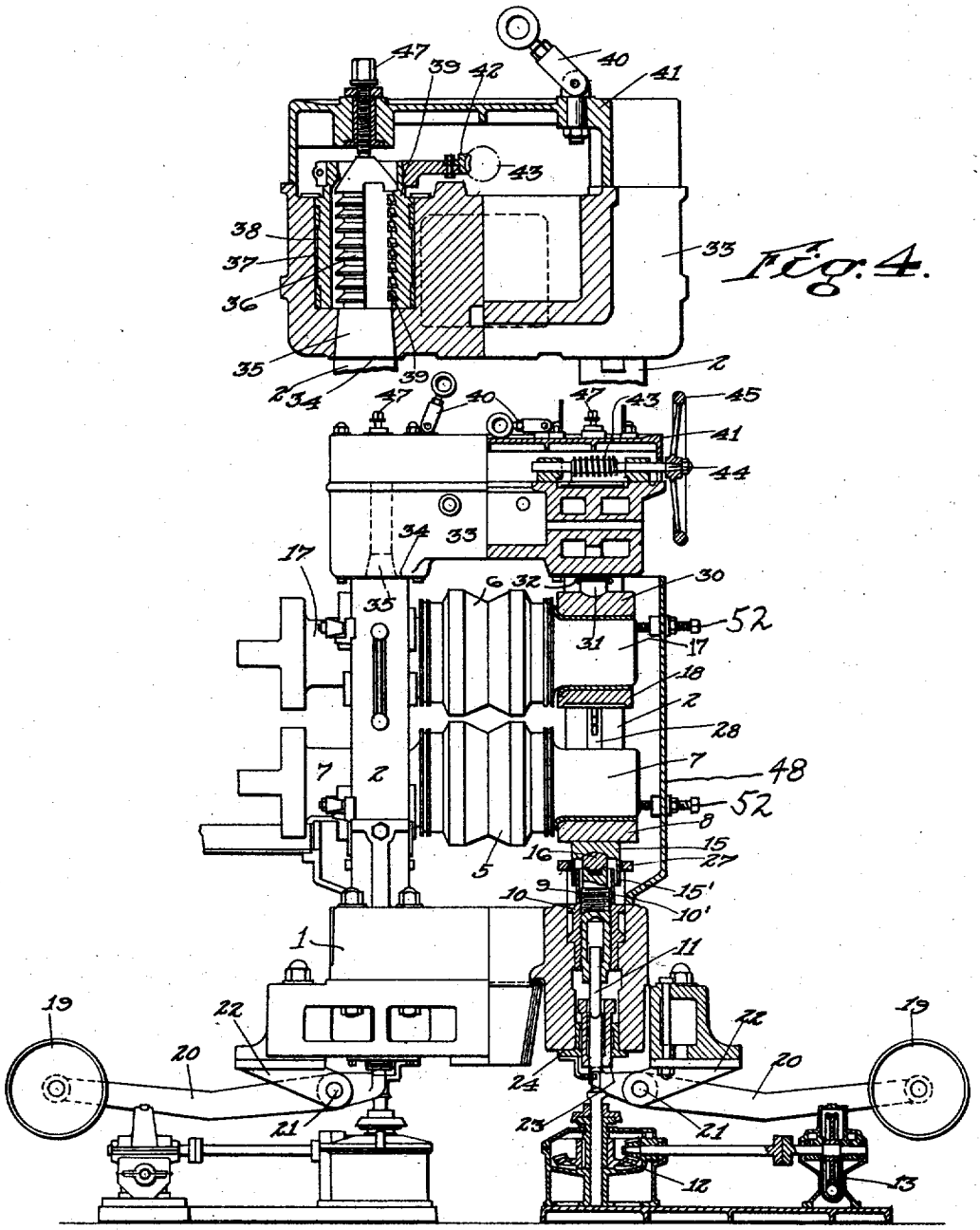
Fig. 1 is a view, partly in front elevation and partly in section, showing a rolling mill housing embodying my invention.
Fig. 4 is a fragmentary sectional view, on a larger scale, of the roll housing cap and its holding-down means.
Figure 3:
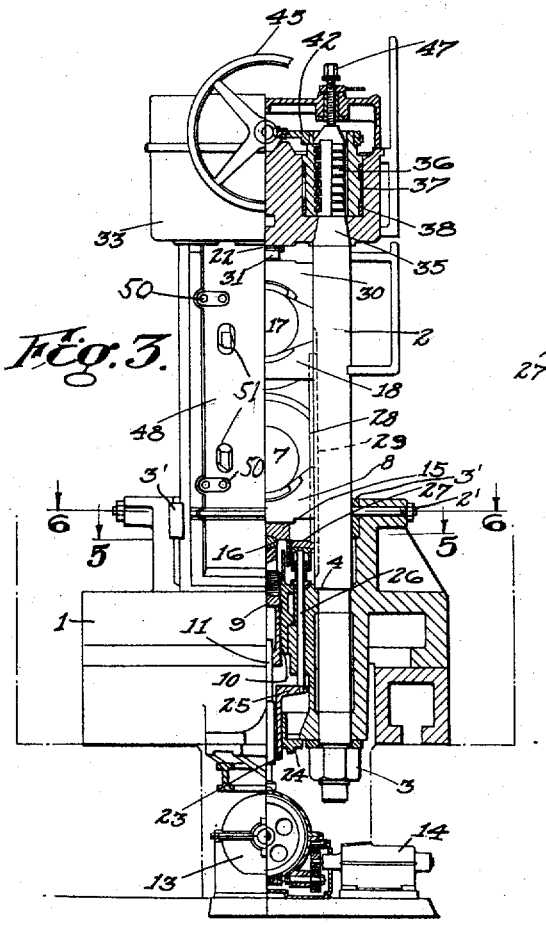
Fig. 3 is a view, partly in side elevation and partly in section, of the housing and associated parts shown in Fig. 1, the section being taken at right angles to the section of Fig. 1.
Figure 5:
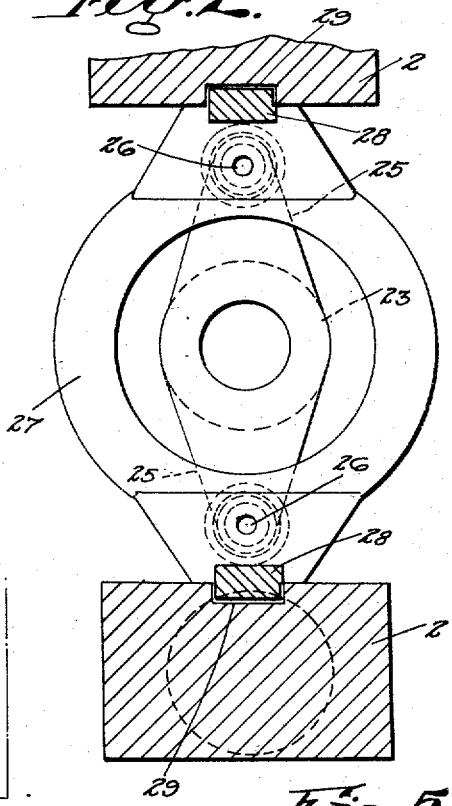
Fig. 5 is a large scale fragmentary sectional view on the line 5—5 of Fig. 3.
Figure 6:
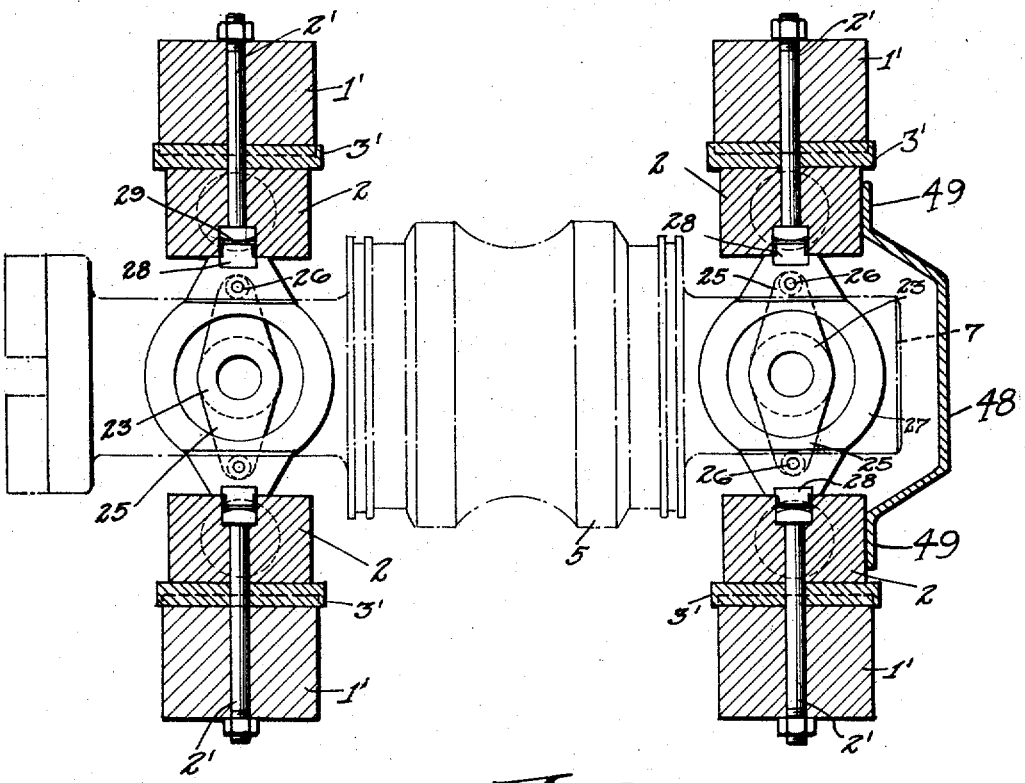
Fig. 6 is a transverse sectional view on the line 6—6 of Fig. 3.

Referring to the drawings, particularly Figs. 1 and 3, the housing base is designated by the numeral 1, and from this base rise vertical columns 2, 2, four in number, which constitute the corner posts of the housing. Each column 2 has its lower end preferably cylindrical and projected through a corresponding hole of the base 1, as shown in Fig. 3, to receive a retaining nut 3. Above the cylindrical portion, each column 2 is rectangular in section, as best shown in Figs. 5 and 6, so that when the nut 3 is tightened against the under surface of the base 1, it draws the shoulder 4 of said column against the upper surface of said base, thereby to rigidly maintain each column 2 in fixed relation to said base. To further increase the stiffness of mounting of the columns 2, 2, the housing base 1 has upward projections 1′, 1′ adjacent the rectangular portions of the columns, for the reception of column-retaining bolts 2′, each of the latter also passing through a shim 3′, which may be varied in thickness to correct the alinement of the column.

The lower and upper reducing rolls of the housing are indicated, respectively, by the numerals 5 and 6, the lower roll 5 having its necks or gudgeons 7, 7 resting upon suitable lower bearings 8, 8 which are supported for vertical adjustment, relative to the housing base 1, in the following manner:—As shown in Figs. 1 and 3, there is provided, in underlying relation to each bearing 8, an adjusting screw 9, having threaded connection with the interior of a stationary nut 10, seated in the housing base 1. A spindle 11 has its upper end polygonal, to make a driving connection with a correspondingly shaped opening of screw 9, thus permitting said screw to move longitudinally of said spindle when being driven thereby. The spindle 11 below said polygonal upper end extends downwardly through an annular member 23, and beyond said member 23, said spindle has an integral extension, whereon is carried a bevel gear 12. Said bevel gear 12 is in mesh with a bevel pinion 12′, whose shaft, as shown in Figs. 1 and 3, is adapted to be rotated through worm gearing 13 from a reversible driving motor 14; when it is desired to raise or lower the roll 5, for adjustment of the reducing pass, the spindle 11 is rotated in the desired direction from said motor 14. Such rotation raises or lowers, as the case may be, the screw 9 in its nut 10 and this vertical movement is imparted to the bearing 8 through an interposed thimble 15 that receives the thrust of screw 9 through a plug 16 rotatably mounted on the upper end of said screw. The thimble 15 has a depending skirt 15′, which cooperates with an upstanding annular flange 10′ on nut 10 to prevent the entrance of water and scale, from the rolling operation, to the threads of screw 9 and nut 10.

The upper reducing roll 6 has its necks or gudgeons 17, 17 supported upon suitable lower bearings 18, 18, and the weight of said roll 6 is sustained by a pair of counterweights 19, 19 in the following manner:—As shown in Fig. 1, each counterweight 19 is carried at the end of an arm 20, said arm being pivoted at 21 to a bracket 22 depending from the housing base 1. At its other end, said arm 20 has bifurcations which lie on opposite sides of the spindle 11, and which engage the lower end of the annular slidable member 23, whose bore provides a guide bearing for the spindle 11. Said member 23 is slidable vertically in a bracket or guide 24 secured to the housing base 1, and said member 23 at its upper end, as shown in Figs. 3, 5 and 6, has opposite lateral flanges 25, 25 for the support of a pair of vertical rods 26, 26 that pass slidably through suitable holes in the housing base 1 and carry at their upper ends a yoke 27. Said yoke 27, which loosely surrounds the thimble 15, takes the downward thrust of a pair of struts 28 that are slidable vertically in grooves 29 provided by the opposing inner faces of the columns 2, 2, and each pair of struts supports and carries one of the lower bearings 18 of upper roll necks 17. Thus in the absence of stock in passage between the upper roll 6 and the lower roll 5, said lower roll 5 is relieved of the weight of upper roll 6, because the lower bearings 18, 18 of the latter are subject normally to upward pressure from the counterweights 19, 19, as exerted through members 23, 23, rods 26, 26, yokes 27, 27 and the pairs of struts 28, 28 supported thereby.

Figure 2:
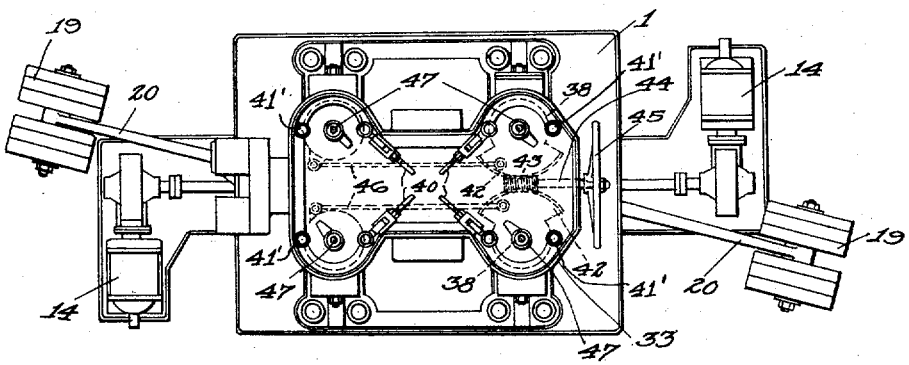
Fig. 2 is a top plan view of the parts shown in Fig. 1.

The upper or holding-down bearings for the necks 17, 17 of upper roll 6 are indicated at 30, 30, these bearings being spaced by means of blocks 31 and adjustable shims 32 from a housing cap 33 which, as received upon and secured to the upper ends of the four vertical columns 2, 2 substantially completes the housing structure. As best shown in Figs. 3 and 4, each upright column 2, near its upper end, is reduced in section from a shoulder 34, to provide a tapering frustoconical portion 35, and beyond this the uniform cylindrical surface of said column is broken by three rows of alined lateral projections 36, 36 in the form of segmental collars, each extending about 60° around the circumference of the column. The housing cap 33 has four tapering apertures in its under side, corresponding to and adapted to receive the conical portions 35, 35 of columns 2, 2, when said cap 33 is lowered into place, to rest on the shoulders 34, 34 of said columns 2, 2. Each of these four tapering apertures of the housing cap 33 is axially alined with an enlarged bore or recess 37, containing an annular member or sleeve 38 that is of sufficient size internally to receive, when properly positioned, the upper segmentally-collared end of column 2. Each member 38 on its inner surface provides three rows of alined lateral projections 39, in matching relation laterally to the spaces between the projections 36 on the column 2, and in order to lower the housing cap 33 into position, the several members 38 must be turned in the recesses 37, so that their projections 39 are angularly displaced and separated from the column projections 36; this allows the housing cap 33, carrying the members 38, to be lowered into place on the columns 2, 2, through the medium, for example, of suitable crane hooks 40, 40 secured to a cover 41 which is suitably secured to the housing cap as by bolts 41′, Fig. 2. When this has been done, said housing cap 33 is ready to be rigidly locked to the housing columns 2, 2 in the following manner:—

The two members 38, 38, at one end of the housing cap, each has secured thereto a worm segment 42, to mesh with a worm 43 on a shaft 44 suitably journalled in the housing cap cover 41, and carrying at its outer end a hand wheel 45. A connecting rod 46 extends from each of said members 38 to one of the other members 38 at the other end of the housing cap, so that all four members 38 are adapted to be simultaneously rotated, when the hand wheel 45 is turned, whereby each set of projections 39 will be carried into interlocking relation with its companion set of projesctions 36 on the column 2. In this way, except as lost motion or play may be present or may develop between the interlocking projections 36 and 39, the housing cap 33, notwithstanding the ease with which it may be removed, is so held as to transmit the upward rolling pressures directly to the four housing columns or corner posts through the interlocking sets of projections 36 and 39. Furthermore, any such lost motion or play that may be present, or that may develop, can readily be absorbed by screwing up on the jack screws 47, 47, four in number, which are threaded into the cover 41, and which bear against the extreme upper ends of the four columns 2, 2. Such action draws the interlocking sets of projections 36 and 39 into close contact, and thereby ties the housing cap 33 rigidly to the four housing columns 2, 2.

It is to be understood that for all ordinary purposes, the adjustment of the reducing pass between the rolls 5 and 6 is accomplished by raising or lowering the lower roll 5, through the action of the adjusting screws 9, 9,—and the shims 32 for the upper bearings 30, 30 of upper roll 6 are simply used to compensate for differences in roll diameters, and in order to maintain constant, or substantially so, the center line of the reducing pass. The removal and replacement of a reducing roll is readily effected, because of the ease with which the housing cap assembly can be unlocked from and lifted off of the corner posts 2, 2.

To permit the insertion of the shims 32, in the adjustment of the upper roll 6, and also to keep said roll from being pushed upwardly, after removal of housing cap 33, by its sustaining counterweights 19, 19, provision is made for removing temporarily the upward thrust of said counterweights 19, 19 on said upper roll. To do this, the motors 14, 14 are operated to give an extended downward movement to the adjusting screws 9, 9; the first result of this downward movement is to contact the under surfaces of thimbles 15, 15 with the flange 10′ of a nut 10, thereby transferring the weight of lower roll 5 from the screws 9 to the housing base 1. Thereafter, the lower ends of screws 9 engage the upper ends of members 23, and when this condition is established, the upward thrust exerted by the counterweights is taken on the threads of the stationary nuts 10, so that not only can the roll 6 be positioned by changing the shims 32, but the cap 33 can be removed without letting said roll be pushed upwardly in the housing.

As shown in Figs. 1, 3 and 6, on the front side of the housing, the roll necks 7 and 17 are shielded by a cover 48. This cover has side flanges 49, 49, by which it is attached to the columns 2, 2, through the use of suitable bolts 50, 50. The cover 48 extends vertically from the base 1 to the underside of housing cap 33, and provides openings 51, 51 therein for the introduction of lubricant to the roll necks 7 and 17. Said cover 48 also carries set screws 52, 52 adapted to bear against said roll necks and to procure longitudinal adjustment thereof in their respective bearings.

I claim,

1. In a rolling mill housing, the combination with an upright column rising from the housing base and providing a plurality of lateral projections, a housing cap, a member carried by said cap and adapted to telescope with the upper end of said column when said cap is lowered onto said column, means for moving said telescoping member into interlocking relation with the lateral projections of said column, and means for taking up the clearance between said projections and said member, when said interlocking relation is established.

2. In a rolling mill housing, the combination with an upright column rising from the housing base, of a housing cap through which said column projects, a plurality of alined lateral projections at the upper end of said column, and a member rotatably supported in said cap in surrounding relation to said column, said member having a plurality of alined lateral grooves to detachably interlock with the projections of said column when said member is rotated.

3. In a rolling mill housing, the combination with an upright column rising from the housing base, of a housing cap in which the upper end of said column is received, a sleeve rotatably supported on said cap and adapted to pass telescopically over the upper end of said column when said cap is lowered into position thereon, and a plurality of internal projections on said sleeve adapted to interlock with said column when said sleeve is rotated in said cap, whereby to transmit the upward rolling pressures received by said cap to said column.

4. In a rolling mill housing, a plurality of upright columns rising from the housing base, a housing cap wherein the upper ends of said columns are received, a plurality of sleeves rotatably mounted in said cap and each adapted to pass telescopically over one of said columns when said cap is lowered into position on said columns, and means for rotating said sleeves in unison, to detachably interlock them with said columns, for transmission to the latter of the upward rolling pressures exerted on said cap.

5. In a rolling mill housing, a plurality of upright columns rising from the housing base, a housing cap wherein the upper ends of said columns are received, a plurality of sleeves rotatably mounted in said cap and each adapted to pass telescopically over one of said columns when said cap is lowered into position on said columns, a matching series of lateral grooves and projections formed externally of each column and internally of each sleeve, which are circumferentially displaced, one from the other, when said cap is lowered into position on said columns, and means for rotating said sleeves in unison to interlock the sleeve projections and grooves with the column projections and grooves, for transmission to said columns of the upward rolling pressures exerted on said cap.

6. In a rolling mill housing, the combination with upper and lower reducing rolls, of a removable housing cap, a counterweight for the support of the upper roll to thrust it against said cap, and vertically adjustable means for supporting said lower roll, said last-named means being movable into a position to take the upward thrust of said counterweight, thereby to permit the fixing of the upper roll in is proper position after the cap has been locked in place.

7. In a rolling mill housing, the combination with upper and lower reducing rolls, of a removable housing cap, a counterweight for the support of the upper roll to thrust it against said cap, and vertically adjustable means for supporting said lower roll, said last-named means being movable to transfer the support of said lower roll direct to the housing base, and thereafter to take the upward thrust of said counterweight from the upper roll bearings.

8. In a rolling mill housing, a housing base, an upright column rising from each of the four corners of said housing base, a housing cap secured to the upper ends of said columns, an upper reducing roll and a lower reducing roll, said rolls having their neck portions interposed between the pairs of upright columns on opposite sides of said housing, and a cover for the roll necks on one side of said housing, said cover extending between said base and said cap and secured by its edges to a pair of said columns, and providing means for the lengthwise adjustment of said rolls.

9. In a rolling mill housing, a plurality of upright columns rising from the housing base, a housing cap wherein the upper ends of said columns are received, a plurality of sleeves rotatably mounted in said cap and each adapted to pass telescopically over one of said columns when said cap is lowered into position on said columns, a matching series of lateral grooves and projections formed externally of each column and internally of each sleeve, which are circumferentially displaced, one from the other, when said cap is lowered into position on said columns, means for rotating said sleeves in unison to interlock the sleeve projections and grooves with the column projections and grooves, for transmission to said columns of the upward rolling pressures exerted on said cap, and means acting between said cap and each of said columns for eliminating lost motion or play between said interlocked projections and grooves.

10. In a rolling mill housing, the combination with upper and lower reducing rolls, of means for vertically adjusting the lower roll, and means telescopically related to said adjusting means for supporting the upper roll.

11. In a rolling mill housing, the combination with upper and lower reducing rolls, of a removable housing cap, a counterweight for the support of the upper roll to thrust it against said cap, and vertically adjustable means for supporting said lower roll, said last-named means being movable into a position to take the upward thrust of said counterweight, thereby to permit removal of said housing cap, in the absence of upward movement of said upper roll.

12. In a rolling mill housing, the combination with upper and lower reducing rolls, of a removable housing cap, a counterweight for the support of the upper roll to thrust it against said cap, and vertically adjustable means for supporting said lower roll, said last-named means being movable to transfer the support of said lower roll to the housing base, and thereafter to take the upward thrust of said counterweight, whereby said housing cap may be removed, in the absence of upward movement of said upper roll.

13. In a rolling mill housing, an upright post rising from the housing base, a housing cap adapted to be lowered onto said post, and a member which telescopes with the upper end of said post when said housing cap is lowered into position thereon, said telescoping member being movable into interlocking relation with said post, for transmitting to said post the upward rolling pressures received by said cap.

14. A rolling mill housing, comprising a base, upright posts carried by said base, and a housing cap adapted to receive the upper ends of said posts, in combination with annular members carried by said housing cap and adapted to telescope with the upper ends of said posts, when said cap is lowered into position thereon, and means for rotating said telescoping annular members into interlocking relation with said posts, to transmit to the latter the upward rolling pressures received by said housing cap.

15. In a rolling mill, a housing base providing upright posts, a housing cap adapted to be lowered thereon into its operative position, and means carried by said cap to telescope with said posts on said lowering movement, said means being movable within the cap when said operative position is reached to interlock said cap with said posts, thereby to transmit to the latter the upward rolling pressures received by said cap.

16. In a rolling mill, a housing base providing upright posts having shoulders near their upper ends, a housing cap adapted to be lowered onto said posts, to seat against said shoulders, and members carried by said cap and telescoping with said posts when the cap is seated on said shoulders, said members being movable into interlocking relation with said posts, for the transmission to the latter of the upward rolling pressures received by said cap.

17. In a rolling mill, a housing structure providing a shoulder, a detachable housing cap adapted in its operative position to seat against said shoulder, a second shoulder provided by the housing structure above the first shoulder, a member within said cap that avoids engagement with said second shoulder in the act of moving said cap into or out of engagement with said first shoulder, and means for moving said member into and out of interlocking relation with said second shoulder.

18. In a rolling mill housing, the combination with upper and lower reducing rolls, of a screw rotatable to effect vertical adjustment of one of said rolls, a counterweight normally sustaining said upper roll, and means brought into operation by rotation of said adjusting screw to relieve said upper roll of the upward thrust of said counterweight.

19. In a rolling mill housing, the combination with upper and lower reducing rolls, of a removable housing cap, a counterweight for supporting said upper roll and thrusting it against said cap, a device for the vertical adjustment of one of said rolls, and means rendered effective by operation of said device for relieving said upper roll of the upward thrust of said counterweight, whereby said housing cap may be removed without letting said upper roll be pushed upwardly in the housing.

JEROME R. GEORGE.